No. 667,045. Patented Jan. 29, 1901.
S. VANSTONE.
WELDING STRIP.
(Application filed Apr. 17, 1899.)
(No Model.)

WITNESSES:
Harry J. Garceau.
John. S. Lynch.

INVENTOR:
Samuel Vanstone
BY Socrates Scholfield
ATTY.

UNITED STATES PATENT OFFICE.

SAMUEL VANSTONE, OF PROVIDENCE, RHODE ISLAND.

WELDING-STRIP.

SPECIFICATION forming part of Letters Patent No. 667,045, dated January 29, 1901.

Application filed April 17, 1899. Serial No. 713,277. (No model.)

*To all whom it may concern:*

Be it known that I, SAMUEL VANSTONE, a citizen of the United States, residing at Providence, in the State of Rhode Island, have invented a new and useful Improvement in Welding-Strips for the Seams of Tubes or Hollow Shafts, of which the following is a specification.

My invention relates to the improved construction of the welding-strip employed for welding the seams of tubes or hollow shafts.

Figure 2:
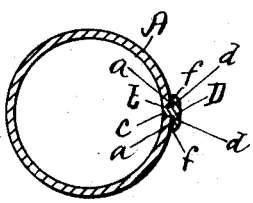
Figure 1:
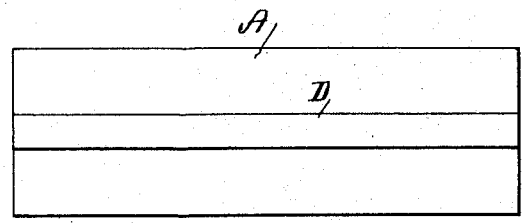
Figure 3:
Figure 4:
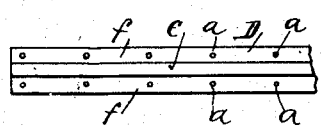
Figure 5:
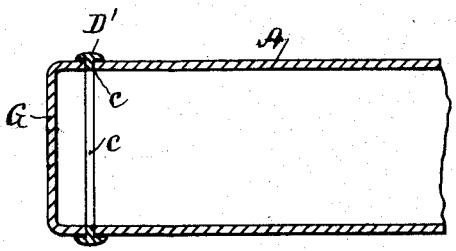

In the accompanying drawings, Figure 1 represents the side view of a tube having its longitudinal seam prepared for welding in accordance with my improvement. Fig. 2 represents a transverse section of the same. Fig. 3 represents a transverse section of the strip employed to form the welded seam. Fig. 4 represents a face view of the same. Fig. 5 represents the longitudinal section of a tube and an axial section of a head to be welded thereto by means of a welding-ring embodying my improvement.

In the drawings, Fig. 2, A represents a plate of metal bent in cylindrical form, with an open longitudinal seam $b$, in which is placed the rib $c$ of the welding-strip D, the said welding-strip being made of any desired length and provided at its inner side with the slight knobs or projections $a\,a$, formed integrally with the strip, whereby the welding-surfaces $f\,f$ will not come in contact with the adjacent surfaces of the bent plate A, but will allow the flame of the furnace to enter the space between these surfaces, and thus properly heat the same for welding. When the welding-strip D is arranged, as shown in Fig. 2, with a suitable flux and properly heated, then by passing the prepared seam under a suitable pressure-roll a strong weld will be effected by the action of the roll, the adjacent parts of the bent plate A being lapped upon the welding-surfaces $f\,f$, with the edges $d\,d$ abutting the sides of the rib $c$.

Figure 6:
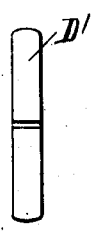

When it is desired to weld a flanged head G upon the end of the tube, the welding-strip D is bent to form a welding-ring D', as shown in the edge view, Fig. 6, the said ring serving to form the welded joint when subjected to the proper degree of heat and the required action of a pressure-roll or hammering.

I make no broad claim to a welding-strip provided with a central rib against which the edges of the seam are abutted and welding-surfaces at opposite sides of the rib, as such a welding-strip has been shown in Letters Patent of the United States No. 509,526.

I claim as my invention—

The welding-strip, provided with the projecting rib, and the welding-surfaces at opposite sides of the rib, the said surfaces being provided with integral raised points or knobs to prevent contact of the surfaces while in the furnace, substantially as described.

SAMUEL VANSTONE.

Witnesses:
SOCRATES SCHOLFIELD,
WALTER E. BURTON.